United States Patent [19]

Becker et al.

[11] Patent Number: 5,857,902
[45] Date of Patent: Jan. 12, 1999

[54] APPARATUS FOR SEPARATING INDIVIDUAL SAUSAGES FROM A STRING OF SAUSAGES

[75] Inventors: Günter Becker, Bramstedt; Heiko Bröer, Loxstedt-Düring; Reiner Schwarzpaul, Bremerhaven, all of Germany

[73] Assignee: Nordischer Maschinenbau Rud. Baader GmbH & Co KG, Lubeck, Germany

[21] Appl. No.: 818,241

[22] Filed: Mar. 14, 1997

[30] Foreign Application Priority Data

Mar. 15, 1996 [DE] Germany .................. 296 04 856 U

[51] Int. Cl.⁶ .................................................. A22C 11/00
[52] U.S. Cl. ........................................................ 452/49
[58] Field of Search ................................................. 452/49

[56] References Cited

U.S. PATENT DOCUMENTS

| | | | |
|---|---|---|---|
| 3,659,316 | 5/1972 | Berendt et al. | 452/49 |
| 3,840,937 | 10/1974 | Berg et al. | 452/49 |
| 4,104,763 | 8/1978 | Tetsuro | 452/49 |
| 4,322,871 | 4/1982 | Townsend et al. | 452/49 |
| 4,366,600 | 1/1983 | Townsend et al. | 452/49 |
| 5,131,884 | 7/1992 | Melanson et al. | 452/39 |

FOREIGN PATENT DOCUMENTS 3535960  10/1985  Germany .
4307637  12/1993  Germany .

*Primary Examiner*—Willis Little
*Attorney, Agent, or Firm*—Fay,Sharpe,Beall, Fagan,Minnich & McKee

[57] ABSTRACT

The invention concerns an apparatus for separating sausages from a string of sausages linked by connecting portions and comprises a conveyor system including at least two conveyors connected in series and comprising upper and lower belts, between which the sausage string is held. The apparatus further comprises a sensing device and cutting means controlled by the sensing device. In order to ensure reliable operation of the apparatus at high speeds and when sausages are misshapen, the connecting portion detection is improved by driving the downstream conveyor at a higher speed than the upstream conveyor so effecting a stretching of the sausage string as it is transferred from one to the other and by using two photosensing detectors mutually spaced along the conveyor and adapted to signal the detection of a connecting portion when the downstream detector registers a low light value and the upstream detector registers a high light value.

14 Claims, 2 Drawing Sheets

APPARATUS FOR SEPARATING INDIVIDUAL SAUSAGES FROM A STRING OF SAUSAGES

BACKGROUND OF THE INVENTION

1. Field of the Invention

The invention concerns an apparatus for separating individual sausages, which are connected together by connecting portions to form a string, the apparatus comprising a conveying system for conveying the sausage string along a conveying path, a cutting apparatus arranged in the area of the conveying path and a sensor device for detecting the positions of the connecting portions between adjacent sausages and controlling the cutting apparatus as a function of these positions.

The sausage string, which is the starting product for this apparatus, is the result of conventional production processes for sausages. The sausage string is formed of a skin, in which sausage meat is progressively stuffed in portions with a specialised filling device. These portions are then separated from one another by twisting the skin or with clips or the like to produce a string of sausages, from which individual sausages must be separated.

2. Prior Art

Separating devices of this kind with diverse designs are known. For example an apparatus is disclosed in DE 43 07 637 C2 with which the sausage string is supplied to a stationary cutting apparatus which is arranged upstream of a further conveyor for carrying away the individual sausages. The cutting apparatus comprises a time-controlled rotating knife having two sickle-shaped blades. The timing of the knife is controlled by a process controller as a function of signals generated by a single light detector.

A further apparatus known from DE 35 35 960 C1 includes a conveying device for advancing a sausage string along the conveying path of a cutting device. The cutting device is controlled by means of a sensor device which scans the connecting portions between adjacent sausages and consists of two scanning arrangements arranged offset from one another along the conveying path. The cutting device is activated when both scanning arrangements register a lack of material.

With separating devices of this kind it is essential that the sausages are separated reliably in the region of the connecting portions when operating with high throughput. This result must also be obtained when the connecting portions are short or asymmetric, as is often the case when natural skin is used, which increases the risk of the sausages being damaged during cutting.

This requirement is not satisfied by conventional devices because the position of the connecting portions cannot be determined with certainty, particularly when the sausage ends are of irregular shape.

OBJECTS OF THE INVENTION

It is a major object of the present invention to overcome the shortcomings of the prior art. To this end, it is thus a particular object of the present invention to propose an apparatus for separating individual sausages from a string of connected sausages which operates reliably at high throughput without damage to the sausages.

It is yet a further object to suggest an apparatus of the type mentioned which is easy to handle and has a structure to be provided at low cost.

SUMMARY OF THE INVENTION

In an apparatus for separating individual sausages from a string of sausages linked by connecting portions, these objects are achieved with a conveyor system for advancing the sausage string along a conveying path and comprising at least a first and second conveying means arranged in series and forming feeding and discharging conveying means, respectively, the second conveying means being adapted to advance the sausage string at a higher speed than the first conveying means such that on transfer from the first conveying means to the second conveying means the sausage string is stretched, a cutting apparatus arranged adjacent the conveying path downstream of the meeting point between the first and second conveying means, and a sensor device including sensing means arranged downstream of the meeting point between the first and second conveying means for determining the position of the connecting portions between adjacent sausages and for controlling the cutting device as a function of these positions.

Due to the advantageous application of a stretching force to the sausage string, the connecting portions are extended so permitting their better detection and thus greatly facilitating the precision of the separating cut.

In a preferred embodiment of the invention the sensing means comprise at least first and second detectors mutually spaced along the conveying path and adapted to emit a signal indicative of the dimensions of the advanced sausage string, the sensor device being adapted to register the position of a connecting portion when the first detector signals a predetermined large dimension and the second detector, upstream of the first detector, signals a predetermined small dimension. This specific disposition and construction of the scanning arrangement enables the connecting portions to be detected with a high degree of certainty even when the sausage ends are of varying shape or the connecting portions are asymmetric or apparent only on one side.

Furthermore a particularly high degree of precision is obtained when the detectors comprise, respectively, pairs of light emitting and receiving strips arranged to oppose one another across the conveying path to form a light barrier transverse to the conveying direction. The position of a connecting portion can then be advantageously registered when the first light emitting and receiving strip pair registers a predetermined low light transmission threshold value and the second pair registers a predetermined high light transmission threshold.

BRIEF DESCRIPTION OF THE DRAWINGS

Further objects and advantageous of the present invention will be apparent from the following description and claims and are illustrated in the accompanying drawings which schematically show a preferred embodiment of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

DETAILED DESCRIPTION OF THE DRAWINGS

The apparatus according to the invention comprises a conveyor system 1, a cutting apparatus 2 and a sensor device 3 all arranged in a machine frame, which is not illustrated and will not be described in detail here.

Figure 1:
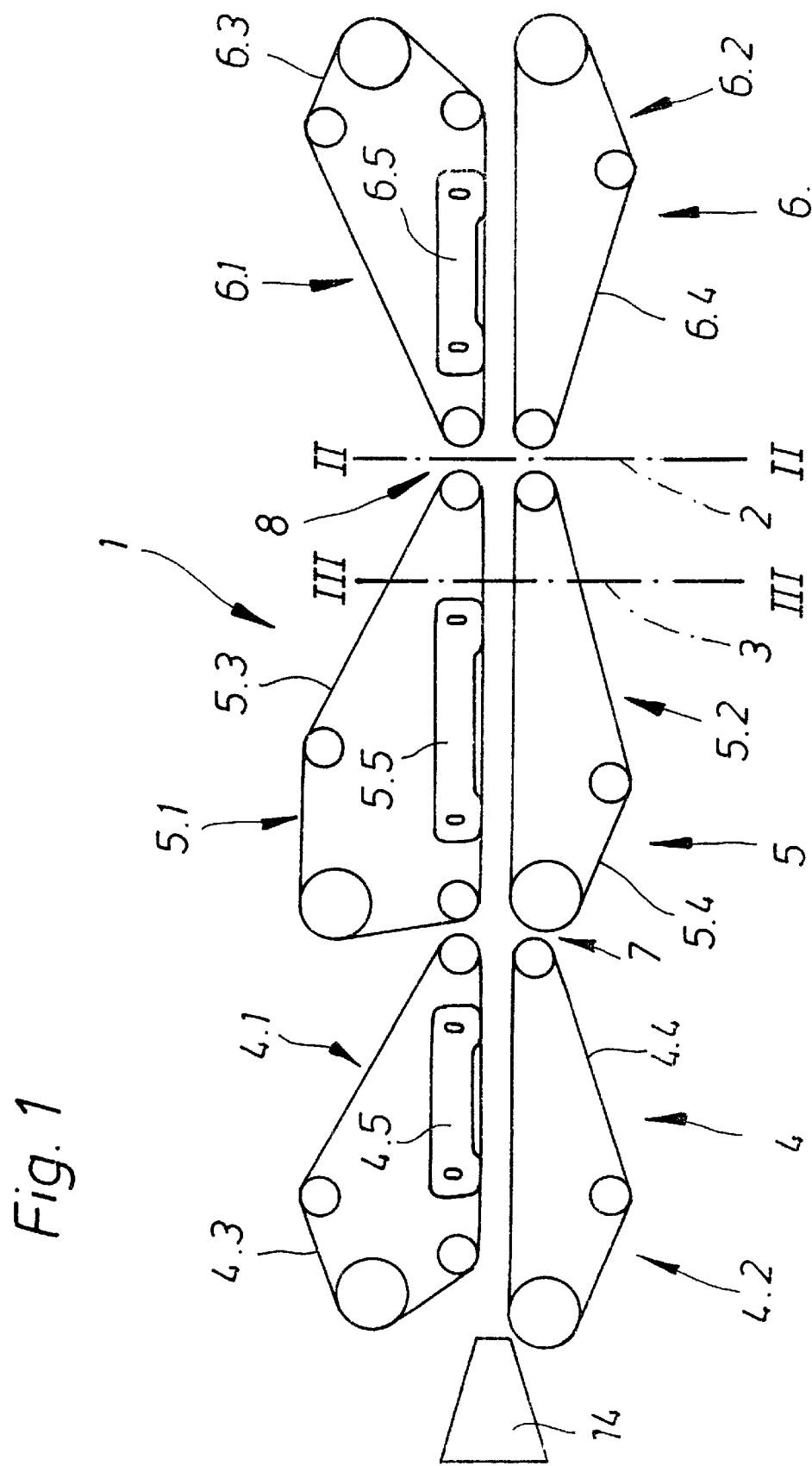
FIG. 1 shows a side view of the overall apparatus.

As shown in FIG. 1, the conveyor system 1 comprises three individual conveyors 4, 5 and 6, each of which include, respectively, an upper partial conveyor 4.1, 5.1, 6.1 and a lower partial conveyor 4.2, 5.2, 6.2, formed of endless conveyor belts 4.3/4.4, 5.3/5.4 and 6.3/6.4, respectively. The belts 4.3/4.4, 5.3/5.4 and 6.3/6.4 are driven to revolve in a common vertical plane and are guided over deflection rollers such that their respective working runs are essentially horizontal and parallel to one another, the working runs of the belts of the same conveyors 4, 5, 6 being arranged to oppose one another across a space. The conveyor belts 4.3/4.4 of the first individual conveyor 4 revolve synchronously and comprise, respectively, a toothed belt which is smooth on the outer surface. The second individual conveyor 5 is arranged downstream of the first conveyor 4 and separated from the same by a gap 7. The conveyor belts 5.1, 5.2 of the second conveyor 5 are provided on both sides with profiled teeth and are synchronously driven at a speed which is greater than that of the first conveyor 4. The third conveyor 6 is arranged downstream of the second conveyor 5 and spaced from the same by a gap 8, and its conveyor belts 6.3, 6.4 are toothed, but smooth on the outside and revolve synchronously. The third conveyor 6 is driven such that its speed is higher than that of the second conveyor 5. The working runs of the upper partial conveyors 4.1, 5.1, 6.1 are biased by upwardly yielding movable tension weights 4.5, 5.5, 6.5. The upper partial conveyors 4.1, 5.1, 6.1 are arranged in a non-illustrated manner to be displaceable as one unit so as to permit the throughput between the working runs of the upper and lower partial conveyors to be varied.

Figure 2:
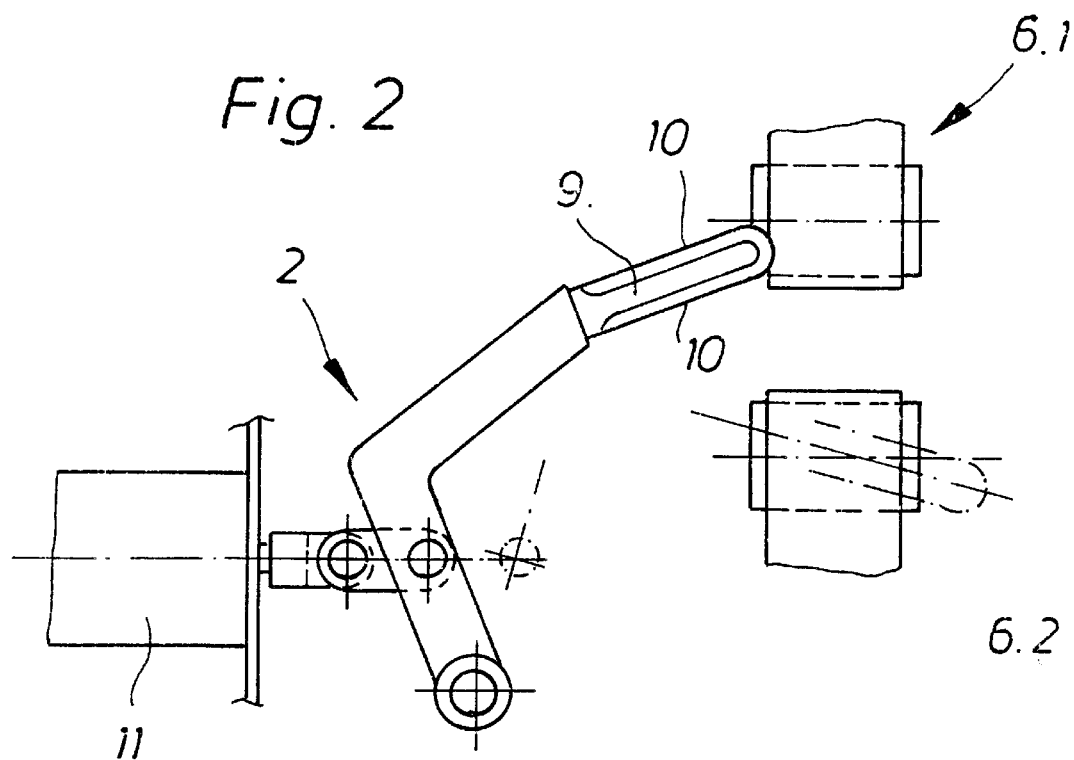
FIG. 2 shows a sectional view of the apparatus along the line II—II of FIG. 1.

The cutting apparatus 2 comprises a knife blade 9 which is arranged in the gap 8 in such a way that it can be rotated in a plane transverse to the conveying path, and has cutting edges 10 on its opposite edges (FIG. 2). In the illustrated embodiment, the operation of the knife blade 9 is effected by a double-action pneumatic cylinder 11. It is, however, conceivable that the movement of the knife be instead controlled by a magnet or electromagnet. The knife blade 9 and its pivot axis are arranged such that the cutting edges 10 cross the conveying path when cutting.

Figure 3:
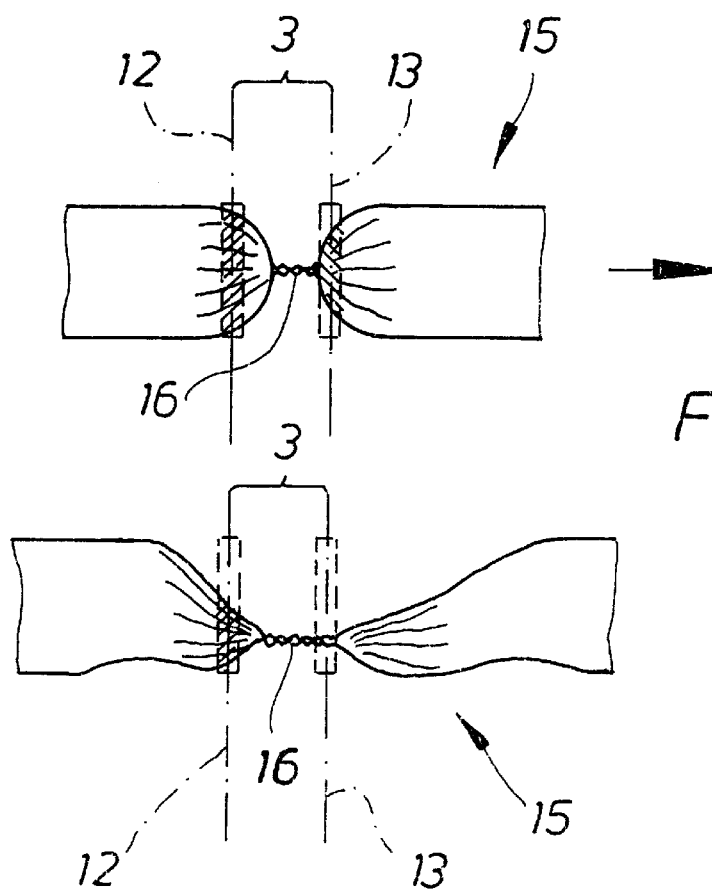
FIG. 3 shows a schematic representation of the scanning procedure for determining the position of the connecting portions between adjacent sausages at the line III—III of FIG. 1.

As shown in FIG. 1, the sensor device 3 is arranged in the vicinity of the second conveyor 5 and comprises two pairs of analogue light emitting and receiving strips 12, 13 spaced from one another along the length of the conveying path (FIG. 3). The light emitting and receiving strips of each pair are arranged to oppose one another so as to form a light barrier or field across the conveying path. Any object passing through this barrier will interrupt the emitted beam and be registered by the corresponding receiver in the form of a reduced light intensity signal. These photosensing strips may consist of an array of light emitting elements and light receiving elements, each receiving element preferably generating a signal indicative of whether its corresponding field is light or dark, i.e. whether a light signal has been received from the corresponding emitter or not. Suitable components for the light emitting and receiving elements are for example light emitting diodes (LED's) and photodiodes, respectively. It is preferable that the strips work with infra red radiation rather than visible light to reduce the effects of interference. The light emitting and receiving strips are preferably configured such that the maximum dark signal is received only when a sausage passes the sensor.

The strip pairs 12, 13 are mutually spaced by an appropriate distance. It has been found that optimal results can be achieved when this distance is 12 mm. However, this distance may of course be appropriately set according to the size and shape of the product being processed.

The sensor device 3 also comprises a control unit, which is not illustrated. This control unit, which may be a CPU, computer or specific hardware or software configuration, evaluates the signals received from the light receiving and emitting elements and, together with information on the speed of the conveyor and the distance between the sensor device 3 and the cutting apparatus 2 controls the operation of the pneumatic cylinder 11 accordingly via actuation means, which are also not illustrated.

The operation of the apparatus according to the invention is as follows.

The sausage string 15 is fed to the apparatus using a feed funnel 14 so that the first sausage becomes safely engaged between the conveyor belts 4.3 and 4.4 of the first individual conveyor 4 and so draws the sausage string into the apparatus where it is advanced without further aid. The spacing between the working runs of the conveyor belts is chosen to enable the individual sausages to be engaged sufficiently well to permit the conveying movement to be transferred to the sausage string 15. This is further promoted by the action of the tension weights 4.5, 5.5, 6.5. In this way, the leading end of the sausage string 15 reaches the second conveyor 5 which stretches the sausage string as a result of its higher speed, although the smooth surfaces of the conveyor belts 4.3, 4.4 of the first conveyor 4 permit a certain degree of slippage to prevent possible damage to the sausages as a result of excess tension. As the sausage string 15 is advanced, it reaches the operative area of the sensor device 3 and interrupts the beams of the pairs of emitter and receiver strips 12, 13 one after the other to generate a minimum light transmission value or "dark" value. As the next connecting portion 16 reaches the area of the sensor device 3, the light transmission to the first light receiving strip 12 is initially somewhat increased and then decreases again until it passes a predetermined threshold value as the next sausage interrupts the beam. This low transmission or "dark" threshold value is set at a level whereby the misshapen ends of sausages, which can not generate the maximum darkness value, as shown in the lower half of FIG. 3, will nevertheless be detected. As this occurs, the light transmission value of the second light receiving strip 13 increases and finally reaches a predetermined high transmission or "light" threshold value. The simultaneous detection of dark and light threshold signals by the first and second pair of light emitting and receiving strips, respectively, causes a switching signal to be generated which is fed to the control unit. This latter unit calculates the exact position of the measured connecting portion with respect to the position of the cutting apparatus using the fixed parameter of the distance between the sensor device 3 and the cutting apparatus strips 12, 13 and the speed of the conveyor 5. It then activates the pneumatic cylinder 11 via the aforementioned non-shown actuation means to cause the connecting portion to be severed when the latter reaches the cutting apparatus.

The pneumatic cylinder 11 is operated such that adjacent connecting portions are cut alternatively from above and from below by the two cutting edges 10.

The knife blade 9 moves with very high velocity, which, in combination with the single stroke movement for each cut, effectively ensures that the build-up and congestion of the sausage string in front of the knife cannot occur.

The control unit can also advantageously be arranged to provide a length measurement of each sausage determined by registering the period between two light signals of a predetermined intensity using a single light emitting and receiving strip. In this manner the sausages can subsequently be ordered according to length, or undersized and oversized sausages rejected.

We claim:

1. An apparatus for separating individual sausages from a string of sausages linked by connecting portions, the apparatus comprising:

a conveyor system for advancing the sausage string along a conveying path and comprising at least first and second conveying means arranged in series, the second conveying means being adapted to advance said sausage string at a higher speed than the first conveying means such that on transfer from the first conveying means to the second conveying means the sausage string is stretched, a cutting apparatus arranged downstream of the meeting point between the first and second conveying means, and a sensor device including sensing means arranged downstream of the meeting point between the first and second conveying means for determining positions of the connecting portions between adjacent sausages and for controlling the cutting apparatus as a function of the position, wherein said sensing means comprises at least first and second detectors mutually spaced along said conveying path and adapted to emit a signal indicative of the dimensions of the advanced sausage string, said sensor device being adapted to register the position of the connecting portion when said first detector signals a predetermined large dimension and said second detector, downstream of said first detector, signals a predetermined small dimension.

2. An apparatus as claimed in claim 1, wherein said detectors comprise, respectively, pairs of light emitting and receiving strips arranged to oppose one another across said conveying path to form a light barrier transverse to the conveying direction, said sensor device being adapted to register the position of a connecting portion when said first light emitting and receiving strip pair registers a predetermined low light transmission threshold value and said second pair registers a predetermined high light transmission threshold.

3. An apparatus as claimed in claim 1, wherein said sensing means operate with infra red light.

4. An apparatus as claimed in claim 1, wherein said conveying means at least comprises, respectively, a pair of endless conveyor belts running essentially in parallel and adapted to hold the sausage string between them.

5. An apparatus as claimed in claim 4, wherein said conveyor belts of said first conveying means comprises a smooth surface for engaging said sausage string and said conveyor belts of said second conveying means comprise a gripping surface for engaging said sausage string.

6. An apparatus as claimed in claim 4, wherein said conveyor belts are guided to revolve in an essentially vertical plane, the upper conveyor belts being associated, respectively, with a tension weight adapted to bias a working run of said upper belt towards a working run of said respective lower belt.

7. An apparatus as claimed in claim 6, wherein the distance between the working runs of said upper and lower conveyor belts is adjustable.

8. An apparatus as claimed in claim 1, wherein said cutting apparatus comprises a double bladed knife having cutting edges on two sides and arranged to move transversely across said conveying path.

9. An apparatus as claimed in claim 8, wherein said knife is arranged to rotate in two directions across said conveying path to permit the alternative use of both cutting edges.

10. An apparatus as claimed in claim 8, wherein said knife blade is driven by means of a pneumatic cylinder.

11. An apparatus as claimed in claim 8, wherein said knife blade is driven by means of a magnet.

12. An apparatus as claimed in claim 8, wherein said conveying system comprises third conveying means adapted to advance the sausage string at a speed higher than said second conveyor means, said knife being arranged to move between said second and third conveying means.

13. An apparatus for separating individual sausages from a string of sausages linked by connecting portions, the apparatus comprising:

a conveyor system comprising at least first and second conveying means arranged in series for advancing the sausage string along a conveying path a cutting apparatus arranged adjacent said conveying path and downstream of the transition point between first and second conveyor means, and a sensing device including at least first and second pairs of light emitting and receiving strips arranged downstream of the transition point between first and second conveyor means, said second pair being arranged downstream of said first pair and the light emitting and receiving strips of each pair being arranged to oppose one another across said conveying path to form a light barrier transverse to the conveying direction, said sensor device being adapted to register the position of a connecting portion between adjacent sausages when said first light emitting and receiving strip pair registers a predetermined low light transmission threshold value and said second pair registers a predetermined high light transmission threshold, and to control said cutting apparatus as a function of these positions.

14. An apparatus as claimed in claim 13, wherein said second conveying means is adapted to advance said sausage string at a higher speed than the first conveying means such that on transfer from the first conveying means to the second conveying means the sausage string is stretched.

* * * * *